United States Patent [19]

Hanaford et al.

[11] 4,289,564
[45] Sep. 15, 1981

[54] STRANDING APPARATUS

[75] Inventors: Donald E. Hanaford, Mesa; Dale R. Oldham, Phoenix, both of Ariz.

[73] Assignee: Arthur E. Thomson, Laveen, Ariz.

[21] Appl. No.: 143,711

[22] Filed: Apr. 25, 1980

[51] Int. Cl.³ .............................................. B65H 81/00
[52] U.S. Cl. ...................................... 156/425; 242/7.21
[58] Field of Search ............... 156/175, 173, 172, 168, 156/425, 433; 242/7.21, 7.22, 7.01, 7.02, 53

[56] References Cited

U.S. PATENT DOCUMENTS

| | | | |
|---|---|---|---|
| 1,250,917 | 12/1917 | McLeod | 156/117 |
| 3,260,796 | 7/1966 | Hirtzer | 156/172 |
| 3,616,070 | 10/1971 | Lemelson | 156/173 |
| 3,649,401 | 3/1972 | Gunnerson | 156/175 |
| 4,024,006 | 5/1977 | Gray | 156/425 |

Primary Examiner—Michael W. Ball
Attorney, Agent, or Firm—H. Gordon Shields

[57] ABSTRACT

Stranding apparatus for fabricating open-weave structures includes a base frame supporting a pair of spaced apart plates, both of which plates includes a plurality of movable pins on which resin impregnated, continuous filament strands are placed. The pins retract into the plates after the resin has cured to allow the stranded product to be removed from the frame. The apparatus rotates about a central axis to provide a plurality of stations at which a specific process or step is accomplished.

15 Claims, 12 Drawing Figures

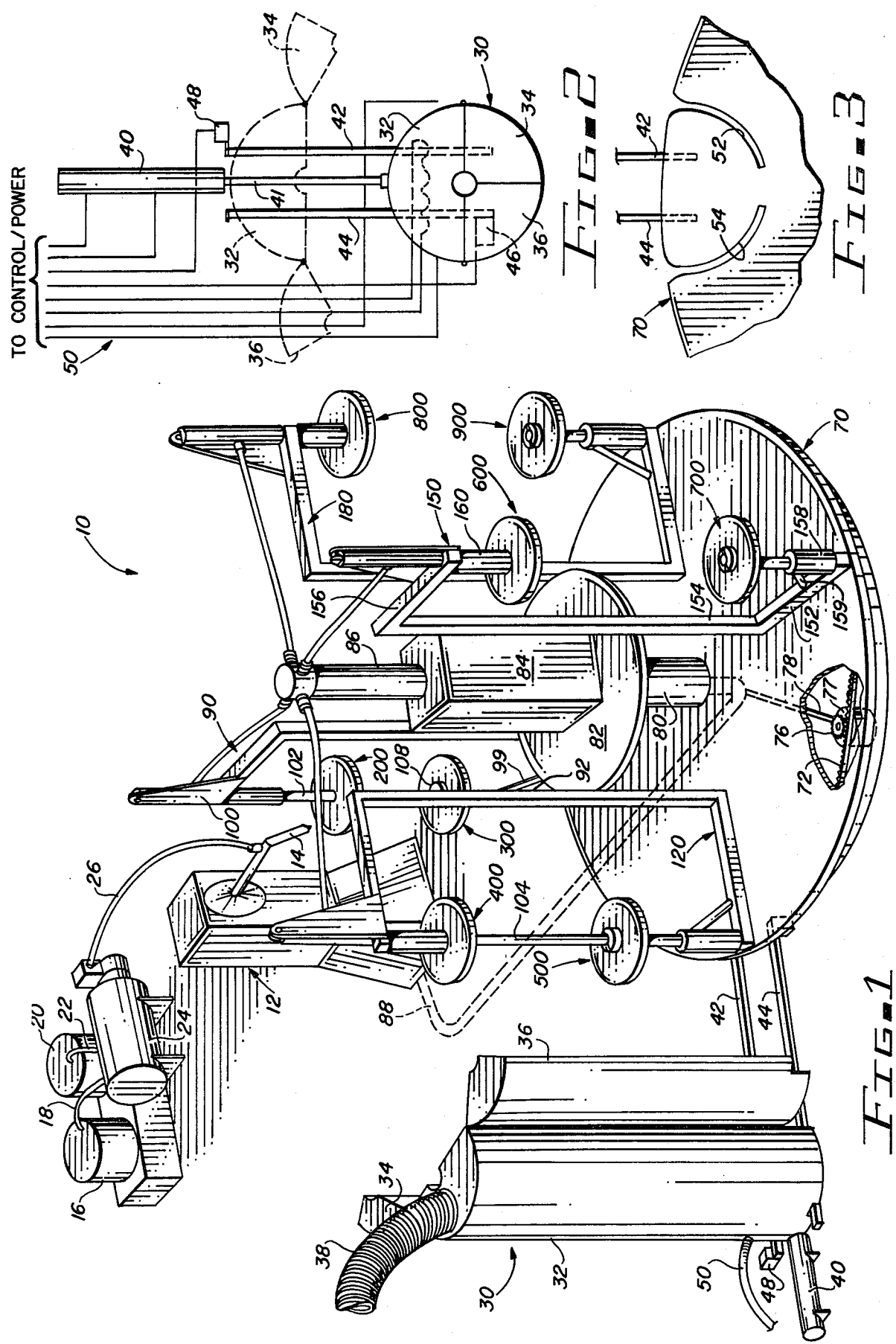

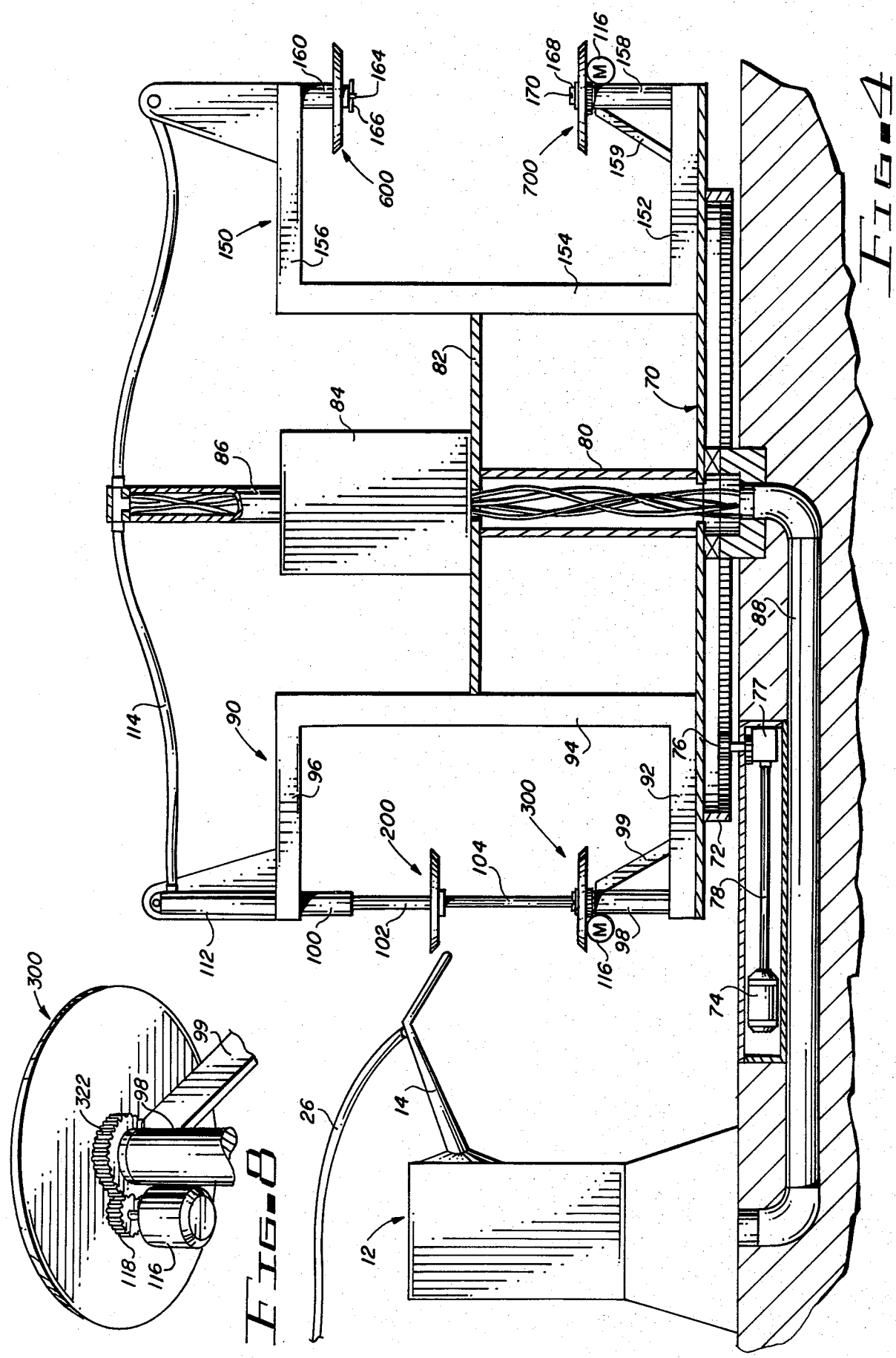

STRANDING APPARATUS

BACKGROUND OF THE INVENTION

1. Field of the Invention

This invention relates to stranding a continuous filament on a frame, and, more particularly, to stranding a resin impregnated continuous filament on a plurality of pins spaced apart from each other for fabricating open-weave structures.

2. Description of the Prior Art

The use of impregnated continuous filament stranding for making generally light-weight elements having substantial strength has gone hand in hand with the development of various types of resins which are liquid for a period of time and, after curing, become very strong. An example of such a resin is the family of products known as various types of "epoxy". The base or primary resin is generally a somewhat viscous liquid under ordinary or normal circumstances, such as at room temperature. The addition of another viscous liquid catalyst, sometimes referred to as a curing agent or hardener, causes the resin to set up or "cure". The resins set up either at room temperature or at an elevated temperature. Typically, the addition of heat, i.e., an elevated temperature, hastens the curing of the resin.

At room temperature, the catalyzed resin has a "pot life" of a predetermined amount of time before the curing process progresses to the point that the resin is no longer workable for practical purposes. If, during the pot life of the catalyzed resin, heat is applied, the curing process is speeded up substantially.

When relatively strong continuous filament material, such as fiberglass roving is impregnated with a catalyzed resin, and the impregnated filament is wound about a form in a predetermined pattern, a relatively lightweight yet strong structure results after the resin has set or has become cured. The filament winding or stranding of the object may define a closed, pressure type, vessel which is capable of withstanding substantial internal and external pressure, or it may take the form of an elongated element, such as a lightweight, yet strong, pole. If the stranding results in an open weave or a lattice-type structure, decorative items, such as furniture, may result. A typical example of furniture structures made by open weave or lattice-type construction is illustrated in U.S. Pat. No. 3,649,401.

SUMMARY OF THE INVENTION

The invention described and claimed herein comprises apparatus for stranding continuous filaments including a pair of plates having a plurality of radially extendable pins disposed outwardly from the plates and the continuous filament strands are disposed about the pins during the stranding process and the pins retract into the plates for removal of the filament strands after the stranding process is completed.

Among the objects of the present invention are the following:

To provide new and useful stranding apparatus;

To provide new and useful stranding apparatus for stranding continuous filament strands;

To provide new and useful apparatus having a pair of spaced apart plates with retractable pins extending radially outwardly from the periphery of the plates;

To provide new and useful stranding apparatus rotatable to a plurality of positions for allowing consecutive steps to take place in the stranding process at each position;

To provide new and useful stranding apparatus having a "C" base frame for supporting a pair of plates on which strands are wound; and To provide new and useful stranding apparatus having a plurality of pins movable from one position to another position for winding the strands on the pins in the one position and for removing the strands from the pins when the pins are moved to the other position.

BRIEF DESCRIPTION OF THE DRAWING

FIG. 1 is a perspective view of the apparatus of the present invention.

FIG. 2 is a top schematic representation of a portion of the apparatus of FIG. 1.

FIG. 3 is an enlarged top view illustrating an alternate embodiment of the apparatus of FIG. 2.

FIG. 4 is a side view in partial section of a portion of the apparatus of FIG. 1.

FIG. 8 is a perspective view of a portion of the apparatus of FIG. 4.

DESCRIPTION OF THE PREFERRED EMBODIMENT

Figure 5:
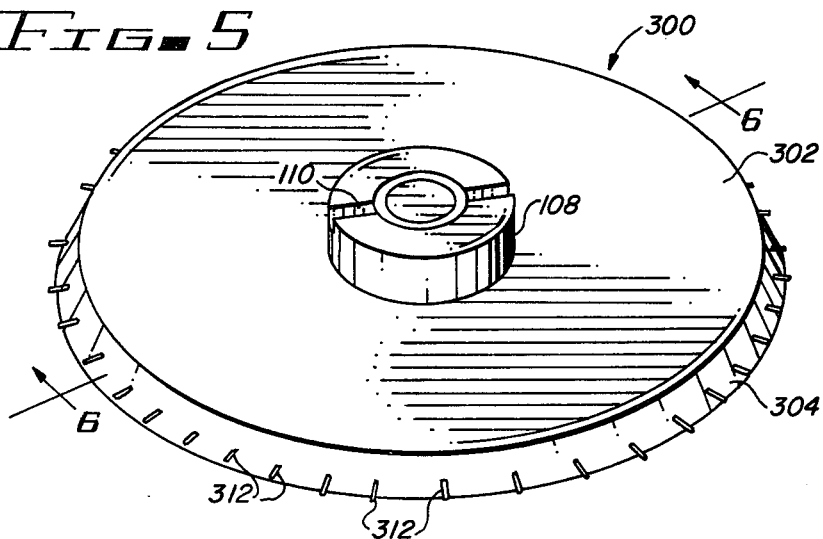
FIG. 5 is an enlarged view of a portion of the apparatus of the present invention.

FIG. 1 comprises a perspective view of filament winding or stranding apparatus 10. The stranding apparatus 10 is used to wind strands of resin impregnated roving, such as fiberglass roving, in a predetermined pattern or configuration. The apparatus includes four stations on a rotating turntable which allows four sequential operations to be accomplished.

The stranding apparatus 10 includes a control assembly 12 which controls the sequential operation of the apparatus 10. Among the various steps controlled by the control assembly 12 is the stranding of the impregnated roving by means of a movable arm 14. The arm 14 is controlled in a predetermined fashion, or according to predetermined parameters, and in accordance with a program, which may be varied, included in the control assembly 12.

Within a container 16 is a quantity of roving material, such as continuous filament fiberglass strands, which are fed from the roving container 16 to a resin tank 24. A pair of roving containers 16 and 20 may be used, if desired. A pair of roving strands 18 and 22 are shown extending from the containers 16 and 20, respectively, to the resin tank 24.

The resin tank 24 contains a quantity of catalyzed resin through which the roving strands 18 and 20 pass or move. In the movement of the strands through the resin, the strands become impregnated with the resin. From the resin tank 24, a resin impregnated strand or strands 26 extends to the control assembly 12, and particularly to the movable arm 14 of the control assembly 12. Under the direction of the program within the control assembly 12, the arm 14 moves vertically upwardly and downwardly and transversely to wind the impregnated roving strands 26 in the desired configuration.

In FIG. 1, the filament strands 26 are wound between a pair of circular plates 200 and 300, both of which include a plurality of radially outwardly extending pins. The roving 26 is wound between pins on the upper plate 200 and on the lower plate 300, as will be discussed in detail below.

The plates 200 and 300 are supported on a C frame 90 which is in turn mounted on a turntable 70. The turntable 70 includes a ring gear 72, which is secured to the bottom of turntable 70. A spur gear 76 meshes with the ring gear 72 to cause rotation of the turntable 70. A gear box 77 is disposed below the spur gear 76, and a shaft 78 extends from a motor 74 (see FIG. 4) to the gear box 77.

For purposes of clarity, the motor 74, gear 76, gear box 77, and shaft 78 have been rotated from the position shown in FIG. 1 to the position shown in detail in FIG. 4, to illustrate the functioning of the overall apparatus in FIG. 4.

The turntable 70 is appropriately supported and journaled for rotation, as shown in FIG. 4. Extending vertically from the center of the turntable 70 is a base column 80. Within the column 80 are a plurality of control cables, pneumatic or hydraulic lines, or the like, as required to operate the apparatus. They are housed in a control duct 88 which extends from the control assembly 12 to the turntable 70. The duct 88 is preferably beneath the floor or surface on which the apparatus is disposed.

Secured to the top of the base column 80 is an intermediate plate 82. Disposed on and secured to the intermediate plate 82 is a housing 84 which may include various controls, switches, and the like, for the turntable 70, which cooperates with the control assembly 12. Above the housing 84 is an upper column 86, which is also hollow, as shown in FIG. 4, to provide a conduit for control cables, tubing, and the like.

Four C frames 90, 120, 150, and 180 are secured to the turntable 70 and to the intermediate plate 82. The C frame 90 is oriented adjacent the arm 14, while the C frame 120, which includes a pair of plates 400 and 500, is shown disposed adjacent a heater 30. C frames 150 and 180, which include pairs of plates 600, 700, and 800, 900, respectively, are at what may be referred to as open stations, where the stranded articles may be removed from the C frames and where the frames may be cleaned.

The purpose of the heater 30 is to hasten the curing operation of the resin impregnated strands after the stranding has been completed. The heater 30 includes an enclosure 32 and a pair of clam shell doors 34 and 36. As the turntable 70 moves from the heater 30, to the position of C frame 150, the stranded article may be removed. Another ninety degree rotation of the turntable, to the position shown for C frame 180, allows for the completing of the cleaning of the C frame apparatus. The cleaning process begins at the station occupied by C frame 150 after the stranded article is removed. The cleaning process is accomplished by the time the turntable 70 rotates another ninety degrees to the position of C frame 90.

The four C frames are disposed ninety degrees apart from each other, and the rotation of the turntable is in ninety degree increments. Four operations may accordingly be carried on at the four C frames at substantially the same time. For example, the first operation is the stranding or filament winding accomplished by the arm 14. While the stranding is taking place at C frame 90, as shown in FIG. 1, the stranded article on C frame 120 may be curing within the heater enclosure 30. At C frame 150, the stranded article, after curing in the heater enclosure 32, is removed from the C frame and the cleanup operation on the C frame is begun. The cleaning operation is completed on C frame 180. After cleaning, C frame 180 is then ready for the next stranding operation, which takes place at the next station, adjacent the arm 14.

During the stranding operation at the first station, located in FIG. 1 at the location of the C frame 90, the plates 200 and 300 rotate during the stranding operation. The two plates 200 and 300 are locked together, as discussed below, and the rotation of the plates is accordingly together. The rotation of the plates is accomplished under the control of the apparatus within control housing 84, which is under the control of the apparatus within enclosure 12. The rotation may be accomplished by an electric stepping motor or by a hydraulic or pneumatic motor, as desired.

The even curing of the strands or the stranded product between plates 400 and 500 within the heater enclosure 30 may also be enhanced by a rotation of the plates 400 and 500 within the heater enclosure 32 and its closed clamshell doors 34 and 36. The plates, of course, are locked together by a common shaft. However, after the apparatus moves from the heater 30, the rotation of the plates at the next two stations is immaterial.

The heater apparatus 30 includes the cabinet 32 which is of a generally elongated, cylindrical configuration. The cabinet moves on a pair of rails 42 and 44 which extend radially with respect to the turntable 70. The heater 30 includes a pair of quarter cylinder clam shell doors 34 and 36, which are shown in FIG. 1 in the open position. The heater 30, with its clam shell doors 34 and 36 open, is ready to move inwardly on the rails 42 and 44, toward the turntable 70. When the heater approaches its inward limit, the stranded apparatus disposed between the plates 400 and 500, as shown in FIG. 1, are enclosed within the cabinet 32 and the doors 34 and 36 close, thus enveloping the plates 400 and 500, and the apparatus stranded therebetween.

The operation of the heater 30 may best be understood in conjunction with FIGS. 1 and 2. The radially inwardly and outwardly movement of the heater 30 is accomplished by actuating cylinder 40. The actuating cylinder 40 may include any appropriate mechanisms, such as an electric motor with a screw drive, or a hydraulic or a pneumatic cylinder, with a piston rod, as desired. A control cable 50, which comprises a plurality of individual cables, is shown in FIGS. 1 and 2 as including the appropriate electrical conductors, for control signals, power, and the like, for the heater 30. The employment of hydraulic or pneumatic actuators may also include appropriate hoses, and the like, for accomplishing the desired procedures with respect to the heater 30.

The actuating cylinder 40 includes a piston rod 41, best shown in FIG. 2, if a hydraulic or pneumatic cylinder is used. The cylinder 40 is secured to the heater cabinet 32. Reciprocating motion of the rod 41 in response to appropriate actuation of the cylinder 40 causes the cabinet 32, and the doors 34 and 36, to move radially inwardly and outwardly with respect to the turntable 70 on the rails 42 and 44. A forward limit switch 46 is disposed adjacent the turntable 70. When the limit switch 46 is actuated by appropriate contact with a part, or an element, of the heater 30, the actuating cylinder 40 is halted and the clam shell doors 34 and 36 move from the open position shown in FIG. 1 to the closed position shown in FIG. 2. The open or outer position of the cabinet 32 is shown in phantom in FIG. 2. The inner or closed position of the cabinet 32 is shown in FIG. 2 in solid lines.

A length of flexible tubing 38 is shown in FIG. 1 extending upwardly from the top of the cabinet 32. Appropriate exhaust fumes may be carried in the tubing 38 away from the cabinet 32, as well as exhaust heat, and the like. In the alternative, if a heating source is not disposed within the cabinet 32, the flexible tubing or duct 38 may provide hot air from an external heating source to the cabinet 32.

The opening and closing of the clam shell doors 34 and 36 may be by electric motor(s), pneumatic or hydraulic motors, and the like. Upon completion of the heating cycle, the clam shell doors 34 and 36 open and the cabinet 32 moves rearwardly on the rails 42 and 44 by retraction of the rod 41 of the actuating cylinder 40. When the cabinet 32 is withdrawn from the turntable 70, the turntable may then rotate ninety degrees. With respect to FIG. 1, the turntable 70 rotates to move the C frame 120 from the position shown, adjacent the heater 30, to the position shown for the C frame 150. The C frame 90, presently located at the stranding arm 14, then moves to the position shown for C frame 120, adjacent the heater 30.

The time frame for rotating the turntable 70 is governed in large measure by the curving time required for the stranded apparatus. That is, the apparatus stranded between the plates on the C frames by the arm 14 is disposed within the heater 30 for a period of time sufficient to allow the resin impregnated strands of roving to cure. At the end of the predetermined curing time, the heater cabinet doors 34 and 36 open, the cabinet 32 moves away from the C frame and from the stranded apparatus extending between the pins on the plates, and the turntable 70 rotates ninety degrees to position each C frame at its next station.

With the C frame 120 positioned away from the heater 30, and with the stranded apparatus extending between the plates 400 and 500 at least substantially cured, the stranded apparatus is removed from between the plates 400 and 500, and the plates, and the affected portions of the C frame 120, are then cleaned ready for the next stranding operation.

The stranded apparatus extending between the plates 200 and 300 is then enclosed in the heater cabinet 32 and the accelerated cure of the resin which impregnates the stranded roving is then accomplished by the elevated temperature within the cabinet 32 of the heater 30.

An alternate arrangement for opening and closing the doors 34 and 36 of the cabinet 32 is illustrated in FIG. 3. A pair of curved or arcuate cam tracks 52 and 54 are shown extending at least part way through the turntable 70. The cam tracks 52 and 54 are disposed adjacent the tracks 42 and 44 on which the heater apparatus 30 moves. Appropriate cam followers secured to the doors 34 and 36 make contact with the tracks or grooves 52 and 54 as the cabinet approaches the turntable 70. The doors accordingly follow the path of the cam tracks 52 and 54 to cause the doors to close as the cabinet approaches the turntable 70. When the inner limit switch 46 is closed (or opened, depending on the type of switch employed) the doors 36 and 34 will be disposed at their innermost position, with respect to the tracks 52 and 54, and accordingly will be in the closed position. When the cabinet 32 moves rearwardly, by the reverse actuation of the cylinder 40, the doors 34 and 36 again follow the contour of the cam tracks 52 and 54 to cause the doors to open. With the doors open, the turntable 70 is able to rotate ninety degrees to allow the stranded apparatus to be removed from the plates.

Utilizing a cam follower, as discussed in conjunction with FIG. 3, the movement of the doors 34 and 36 is a function of the location of the cabinet 32 with respect to the turntable 70. The doors move automatically as the cam follower contacts the cam grooves or tracks 52 and 54 as the cabinet moves radially inwardly toward the turntable 70. The doors open automatically as the movement of the cabinet 32 is reversed to cause it to move radially outwardly away from the turntable 70. Obviously, any appropriate method may be used for opening and closing the clam shell doors 34 and 36 with respect to the cabinet 32.

It will be noted that an appropriate relieved portion, or that appropriate relieved portions, are included in the upper or top portion of the cabinet 32 and the doors 34 and 36 to allow the cabinet to completely envelope the apparatus stranded between the plates 400 and 500. The relieved portions accordingly receive the upper cylindrical portions of each of the C frames, in turn. For example, with respect to the C frame 90, as best shown in FIG. 4, the relieved portions at the upper part of the cabinet 30 enclose an outer, upper tubular member 100. The C frame 190 includes an outer, upward tubular member 130 which is enclosed by the heater 30 and which accordingly extends into the relieved portions. The bottom of the cabinet 32 and the doors 34 and 36 are also appropriately relieved to fit over the turntable 70 and around the bottom of the C frame.

FIG. 4 comprises a view in partial section through a portion of the stranding apparatus 10 of FIG. 1. For clarity of illustration of the cooperative elements involved, the motor 74 has been rotated from the position shown in FIG. 1 to beneath the turntable 70 adjacent the C frame 90. The duct 88 is shown extending from the control assembly 12 to the center portion of the turntable 70. The central column base 80 is shown as comprising a cylindrical section, through which a plurality of control cables, and the like, extend from the duct 88 to the housing 84. The housing 84 includes the appropriate control elements, circuits, etc., for the four discrete C frames. The operation of the C frames will be discussed below.

Beneath the turntable 70, and secured thereto, is the ring gear 72 which meshes with a spur gear 76. The spur gear 76 is in turn connected by appropriate linkage to a gear box 77 which is driven by the motor 74 through a shaft 78. The actuation of the motor is, of course, under the general control of the particular program which controls the stranding operation of the arm 14, the actuation of the heater 30, and the like. The motor 74 actuates periodically to cause the turntable 70 to rotate in ninety degree increments, as discussed above.

The C frame 90 includes a lower bracket or frame member 92 which is disposed on and appropriately secured to the turntable 70. A vertical frame member 94 extends upwardly from the lower frame member 92 to an upper frame member 96. The frame members 92 and 96 are substantially parallel to each other, joined at their inner ends to the vertical frame member 94. The vertical frame member 94 is also secured to the intermediate plate 82. The frame members 92 and 96 define horizonally extending arms of the C frame 90.

Extending upwardly from the outer end of the bottom or lower frame member 92 is a lower vertical support member 98. A brace 99 extends diagonally from the upper portion of the support member 98 to the frame member 92. The plate 300 is appropriately disposed, and journaled for rotation, on the lower support element 98.

Extending downwardly from the outer end of the upper frame member 96 is an outer tubular member 100. The tubular member 100 is appropriately secured to the frame member 96. It will be noted that the terms "outer" and "inner" with respect to the elements 98 and 100 and the arms 92 and 96 refer to the "outer" periphery of the turnable 70, remote from the vertical frame member 94. The same terminology will also be applied with respect to the various frame members or elements of the C frame 150.

Moving telescopically within the tubular member 100 is a central or intermediate tubular member 102. The plate 200 is appropriately secured to the tubular member 102. The upper limit or vertical extent of the movement of the plate 200 is determined by the length of the tubular member 100. In FIG. 4, the plate 200 is shown disposed at about its lower limit with respect to the outer tubular member 100. The plate 600 of the C frame 150 is shown disposed in its upper limit, adjacent its outer tubular member 160. The tubular members 100 and 102 are upper support elements for the upper plate 200. They are axially aligned with the lower support element 98.

An inner tubular member 104 is shown extending between the plate 200 and the plate 300. The tubular member 104 includes a pin 106 which extends diametrically outwardly with respect to the tubular member 104. The pin 106 cooperates with a slot 110 (see FIG. 5) on an upwardly extending boss 108 of the plate 300 to lock the plates 200 and 300 together for common or joint rotation about a common axis. The relative rotation of the plates is accordingly prevented when the tubular member 104 is in its downward position, with the pin 106 disposed in the slot 110.

The tubular member 104 moves vertically within the tubular member 102 and relative thereto. An actuating cylinder 112, which may be a hydraulic cylinder, a pneumatic cylinder, or the like, is used to raise and lower the member 104. An appropriate conduit 114 extends from the upper part of the upper column 86 to the cylinder 112. If desired, an electric motor with an appropriate pulley arrangement may be used to raise and lower the element 104, rather than a pneumatic or hydraulic unit. The element 104 has been described above as a "tubular" member, but it is obvious that a solid shaft may do, if desired. The use of a tubular member, hollow in the center portion thereof, may be preferable for most uses, due to its lighter weight than a solid shaft.

Prior to the beginning of the stranding operation, the member 104, which comprises a locking element to lock the plates 200 and 300 together to prevent relative rotation, is lowered with respect to the plate 200. The pin 106 is disposed in the slot 110 to lock the two plates together. Obviously, the member 104 is appropriately keyed to the plate 200 or to the tubular member or shaft 102, which is secured to the plate 200, to prevent relative rotation thereof. Since the plate 200 is fixed relative to the element 102, when the pin 106 of the inner element 104 is in the slot 106 of the plate 300, the plates 200 and 300 rotate as a unit, under the appropriate control of the central program during the stranding operation accomplished by the arm 14 and, again, under the control of a central program.

A motor 116 is shown secured to the support member 116, and connected to the control cables within the column 80 by a conductor (or by conductors) 118. The motor 116 comprises an appropriate reversible motor secured to the plate 300 for rotational movement of the plates 200 and 300. Since the plates 200 and 300 are secured together for joint rotational movement by the shaft 104, actuation of the motor 116 results in movement of both plates 200 and 300.

As the arm 14 winds the resin impregnated filament strands back and forth (or up and down) between pins on the plates 200 and 300, the plates 200 and 300 rotate in predetermined amounts and directions to provide the desired stranding pattern. The stranding pattern is, as discussed above, under an appropriate program control.

At the completion of the stranding process, the shaft or locking element 104 may be moved upwardly. When the resin has set up or cured, the pins which extend radially outwardly from the plates 200 and 300, and which are shown in detail in FIGS. 5, 6, 7A and 7B, are moved inwardly to allow the stranded product to be removed from the C frame 90. After the stranded product is removed, the locking shaft 104 moves upwardly, relative to the plate 200 and the shaft 102 until the pin 106 contacts the bottom of the plate 200. Since the pin 106 is of a substantially larger diameter than the shaft 104, and accordingly larger than the inside diameter of the shaft 102, the pin 106 will not move within the shaft 102. Rather, the pin then acts as a support element to raise the plate 200 and its shaft 102 within, and relative to, the outer, upper tubular member 100, and along the axis of rotation of the plate 200 and the shafts 102 and 104. As indicated above, the plate 600 is shown in its upper position in FIG. 4, supported by pin 166 and shaft 164.

The C frame 150 is substantially identical to the C frame 90. It includes a lower frame member 92 secured to the lower bottom end of the vertical frame member 154, and an upper frame member 156 also secured to the vertical frame member 154. The frame member 156 is substantially parallel to the frame member 154, and is secured to the opposite end of the vertical frame member 154 from the frame member 152. Extending upwardly from the outer end of the frame element 152 is a lower support member or element 158. A brace 159 extends diagonally between the lower frame member 152 and the lower support element 158. The plate 700 is disposed on the lower support 158, and rotates relative thereto.

Extending from the upper frame member 156, in parallel alignment with the frame member or support 98, is an upper, outer tubular member 160. The tubular member 160 is comparable to the tubular member 100. The plate 600 moves on its shaft, an intermediate or central shaft, and its shaft is disposed with and moves relative to the tubular member 160. A locking shaft or inner tubular member 164, mentioned above, comparable to the shaft 104 of C frame 90, is disposed within and moves relative to the tubular member 160. The shaft 164 includes the pin or key 166 which extends into a slot 170 on a boss 168 of the plate 700. With the key or pin 166 in the slot 170, the plates 600 and 700 are locked to prevent relative rotation.

A motor 176 is secured to the support member 158 and connected to the appropriate control apparatus by a cable (or cables) 178. The motor rotates the plates 600 and 700 during the stranding process for the C frame 150, as discussed above in conjunction with motor 116 of the C frame 90.

Figure 6:
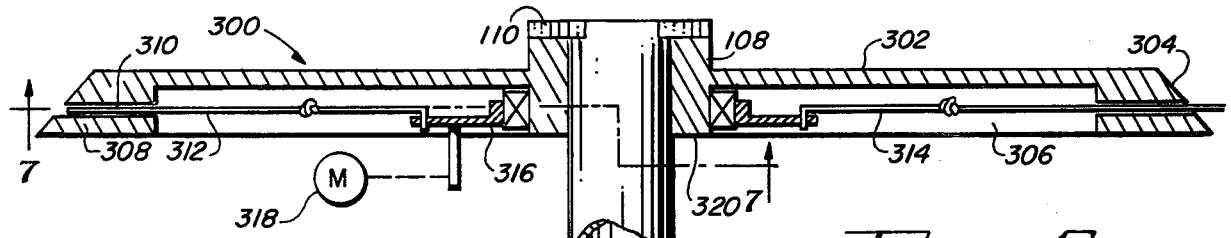
FIG. 6 is a view in partial section of a portion of the apparatus of FIG. 5, taken generally along line 6—6 of FIG. 5.
Figure 7A:
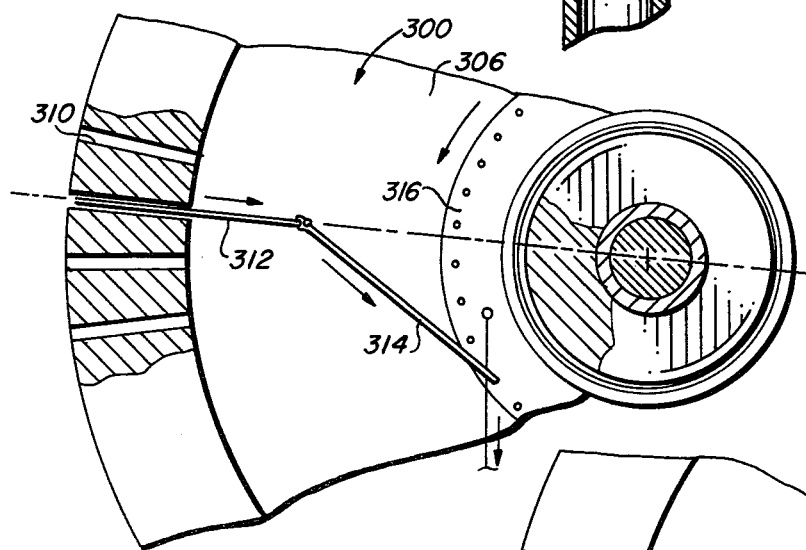
FIG. 7A is a view of a portion of the apparatus of FIG. 6, taken generally along line 7—7 of FIG. 6.
Figure 7B:
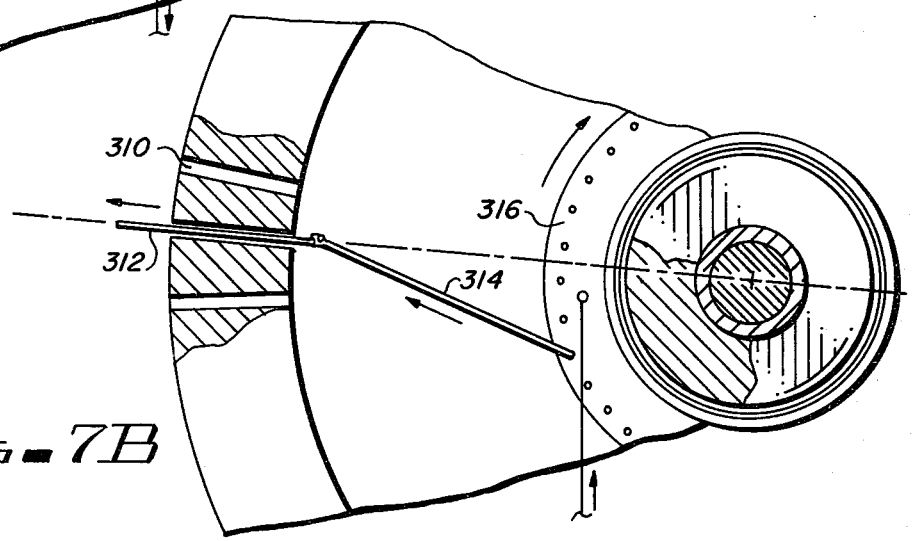
FIG. 7B is a view in partial section of a portion of the apparatus of FIG. 6, taken generally along line 7—7 of FIG. 6, with FIGS. 7A and 7B illustrating sequential operation of a portion of the apparatus of FIG. 6.

FIG. 5 is a perspective view of the plate 300. FIG. 6 is a view in partial section of the plate 300 of FIG. 5, taken generally along line 6—6 of FIG. 5. FIGS. 7A and 7B are fragmentary sequential views of a portion of plate 300 of FIGS. 5 and 6, illustrating a method for mechanically moving the pins radially inwardly and outwardly with respect to the plate 300. Reference will be made to FIGS. 5, 6, 7A, and 7B, for the following discussion.

The plate 300 is of a generally circular configuration. It includes a planar top surface 302 and a peripheral outer surface 304 which slopes outwardly and downwardly from the top surface 302. Beneath the top surface is a relieved, or concave, bottom portion 306. An outer wall portion 308 extends between the peripheral outer sloping surface 304 and the relieved bottom portion 306. The outer wall portion 308 is generally circular and comprises the full thickness of the plate 300.

A plurality of holes or relatively small, narrow diameter bores 310 extend radially through the outer wall portion 308 to provide communication between the relieved bottom portion 306 and the outer surface 304. A plurality of pins 312 extend through the holes 310 and outwardly with respect to the plate 300. The pins 312 move axially in their respective holes or bores through a pin actuator link 314 which is secured to each pin 312. The actuator links 314 are in turn secured to a central collar 316 which pivots or moves relative to the plate 300 on appropriate bearings.

Extending upwardly from the plate 300 is a boss 108. The boss 108 and its slot 110 have been discussed above, in conjunction with FIG. 4. Centrally disposed with respect to the plate 300 within the relieved bottom portion 306 is a central hub 320. The hub 320 is a vertically downwardly continuation or extension of the boss 108. The collar 316 is appropriately secured for rotation about the hub 320.

As best shown in FIGS. 7A and 7B, which are fragmentary views of a portion of the plate 300, looking upwardly, in the direction of the line and arrows 7—7 of FIG. 6, the movement of the collar 316 relative to the plate 300 is illustrated. A single pin 312 is shown extending through a hole or bore 310. The pin 312, remote from the outer wall 304 and within the relieved portion 306, is shown secured to an actuating link 314. The actuator link 314 is in turn secured to the collar 314. A reversible motor 318, or actuating cylinder, as desired, is appropriately secured to the collar 316. Actuation of the motor or cylinder causes the collar 316 to move (rotate) relative to the plate 300 a limited distance sufficient to withdraw or retreat the pin 312 from its outer position, shown in FIG. 5 and in FIG. 7B, to its inner or retracted position, as shown in FIG. 7A. With the pin 312 in its inner position, the pin 312 is disposed within the slot or bore 310, and accordingly does not protrude outwardly from the surface 304. With the pins retracted, the stranded article may be removed from between the plates 200 and 300.

Movement of the collar 316 in the opposite direction, as indicated by the arrow in FIG. 7B, causes the actuating link 314 to move the pin 312 outwardly through the hole 310 to its outer position. With the pin 312 in its outer position, it is ready to be used for stranding purposes.

For stranding, the plate 300, and all of the other plates attached to the C frames, are disposed with their pins in the outer or extended position. In FIG. 5, the plurality of pins 312 are shown extending outwardly from the surface 304 of the plate 300. The arm 14 is accordingly able to wind strands around the pins 312 in appropriate configurations for stranding a product or article, as desired.

For stranding an article between the upper and lower plates, the plates rotate together as the arm 14 moves vertically upwardly and downwardly. The rotation of the plates is accomplished by appropriate reversible motors. In FIG. 4, a motor 116 is schematically represented as secured to the lower post 98 and in operative contact with the lower plate 300. A similar reversible motor 176 is schematically represented as secured to the lower post 158 and in operative contact with lower plate 700 of the C frame 150. The locking together of the upper and lower plates on each frame has been discussed above, and is also discussed below. Since the plates are secured together for joint or common rotation, a single motor on each frame allows the plates, and the apparatus being stranded between the plates, to be rotated in conjunction with the vertical upwardly and downwardly movements of the stranding arm 14 to define any desired stranding pattern.

The control of the plate rotary motors for each C frame, such as the motors 116 and 176 illustrated in FIG. 4, is accomplished by a central control apparatus, such as a computer, or the like. Accordingly, electrical conductors (not shown) are secured to the motors and they extend to the central column 80 (see FIG. 4) and from the central column 80 to the control apparatus either disposed in the control assembly 12 or housing 84, as desired.

While a C frame is at what may be referred to as the stranding or first station, opposite (or adjacent to) the stranding arm 14, the rotation of the plates is in relatively short increments in opposite directions to provide the appropriate filament winding or stranding pattern. At the next station, or at what may be referred to as the curing station, with the stranded apparatus within the heater cabinet 32, rotation of the plates and stranded apparatus may not be required. If desired, though, the rotation may be in a single direction and at a relatively low rpm.

It will be noted that some resins may be light sensitive with respect to curing. If such are used, then the heater apparatus 30 may be a light cabinet rather than a heater cabinet, as discussed. Hence the term "curing cabinet" or "curing station" may be a more appropriate and broader term than "heater cabinet."

At the next two stations, which may be referred to as the cleaning and preparation stations, respectively, rotation of the plates by the motors is not necessary. The cleaning of the plates may be accomplished with manual rotation of the plates, if desired. Moreover, the plates will probably not be secured together by their locking shafts. Similarly, the preparation of the plates and pins for the next stranding operation, after cleaning, may not require mechanical rotation, but only manual rotation, if any. The preparation includes the application of wax or other release agents, and accordingly only limited rotation is necessary.

FIG. 8 illustrates the operation of the motor 116 and the plate 300. The motor 116 is appropriately secured to the lower post 98. The motor includes the shaft and a driving gear 118. The driving gear 118 is coupled to a driven gear 322 secured to the hub 320 of the plate 300. The meshing of the spur or driving gear 118 with the driven gear 322 causes the plate 300 to move in response to actuation of the motor 116. When the locking element or member 104 is in its downward position, with its pin 106 disposed in the slot 110 of the upwardly extending boss 108, the plates 200 and 300 move jointly for rotational movement as driven by the motor 116.

Figure 9:
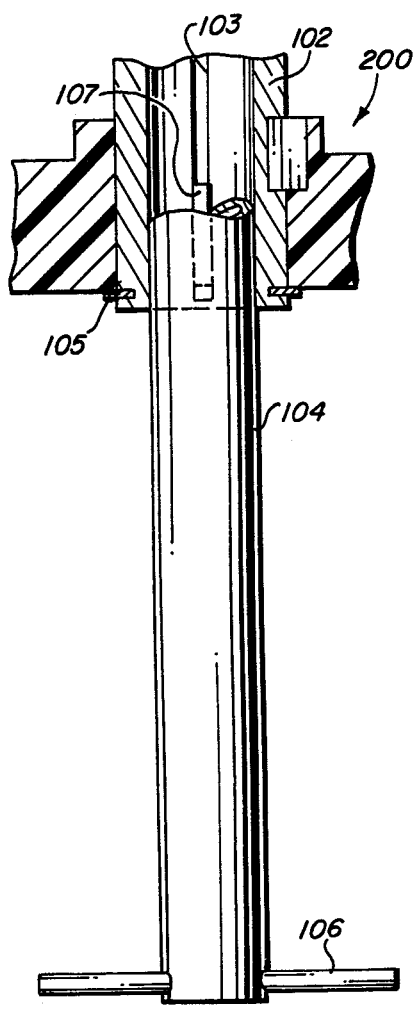
FIG. 9 is an enlarged view in partial section of a portion of the apparatus of FIG. 4.

FIG. 9 is a fragmentary view in partial section illustrating the locking of the shaft 104 and the plate 200 together for joint rotational movement. The plate 200 is secured to the central shaft 102 against relative rotary movement by a key 204 which extends into a key slot 202 in the plate 200. The key 204 also extends into an appropriate groove or slot in the shaft 102. An appropriate element, such as a C ring or snap ring 105 extends into an outer, circumferentially extending groove at the lower portion of the shaft 102. The snap ring 105 extends outwardly from the circumferentially or peripherally extending groove and provides a horizontally extending surface which abuts against the bottom or lower portion of the plate 200. The snap ring 105 prevents the plate 200 from moving downwardly with respect to the shaft 102. Thus, when the shaft 102 moves upwardly, the plate 200 moves therewith.

A key 107 is secured illustratively to the shaft 104. The key 107 extends from the shaft 104 into a vertically or axially extending slot 103 in the shaft 102. Thus, relative rotational movement is prevented between the shafts 102 and 104 by the key 107. Obviously, other appropriate arrangements may also be used to prevent relative rotational motion between the shafts and the plates from those discussed herein.

Figure 10:
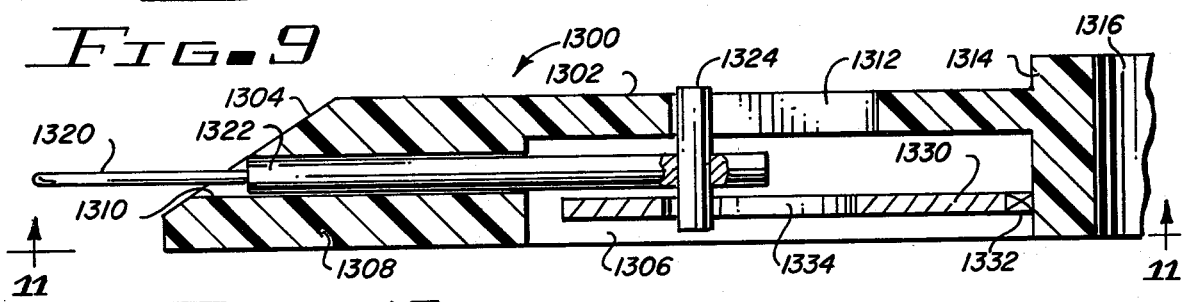
FIG. 10 is a view in partial section of a portion of an alternate embodiment of the apparatus of FIG. 6.
Figure 11:
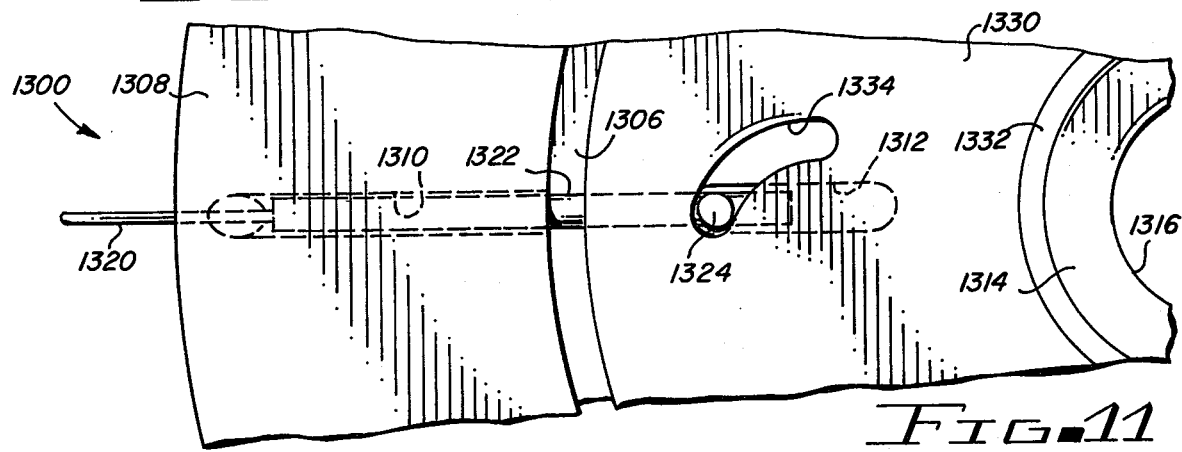
FIG. 11 is a view of a portion of the apparatus of FIG. 10, taken generally along line 11—11 of FIG. 10.

FIGS. 10 and 11 illustrate another type of stranding pin movement apparatus. FIG. 10 is a view in partial section through a portion of a plate 1300, which is substantially identical in general overall configuration to the plate 300 illustrated and discussed above in conjunction with FIGS. 1–7. FIG. 11 is a fragmentary view of a portion of the plate 1300 of FIG. 10 taken generally along line 11—11 of FIG. 10. The plate 1300 includes a top surface 1302, an outwardly and downwardly sloping surface 1304, and a bottom relieved portion 1306. An outer wall 1308 extends outwardly from the relieved portion 1306, and it includes a radially extending bore 1310 which communicates between the relieved portion 1306 and the outer surface 1304.

Extending through the top or upper surface 1302 is a radially extending slot 1312 which is aligned with the bore 1310. The slot 1302 communicates with the concave relieved portion 1306. The relieved portion 1306 extends between a central hub portion 1314 and the outer wall portion 1308, and downwardly from the upper web portion, the top of which is the flat, planar surface 1302. A central bore 1316 extends vertically through the hub 1314.

A stranding pin 1320 extends outwardly from the bore 1310 and past the sloping outer surface 1304 of the plate 1300. The pin 1320 extends outwardly beyond the outer periphery of the plate 1300 in its extended position, as shown in FIGS. 10 and 11. The pin 1320 is accordingly in its outer or extended position, ready to receive a filament strand. The pin 1320 is secured to a pin holder or sleeve 1322 which is disposed within the bore 1310. Since the diameter of the bore 1310 is substantially larger than the pin 1320, an appropriate pin guide, such as the holder or sleeve 1322, is used to hold and to guide the pin 1320 in the bore 1310. The diameter of the element 1322 is slightly less than that of the bore 1310, and the sleeve 1322 accordingly moves freely within the bore 1310.

A guide or cam pin 1324 is secured to the guide 1322 and it extends substantially vertically perpendicularly thereto. The pin 1324 extends upwardly into the slot 1312, which is aligned with the bore 1310. The width of the slot 1312 is sufficient to accommodate the pin 1324. The radial length of the slot 1312 is sufficient to allow the pin 1320 to move to its outermost position, as shown in FIGS. 10 and 11, and to be withdrawn from its outer position into the bore 1310 to allow the filament wound apparatus standard on the pin to be removed from the plate 1300.

The guide or cam pin 1324 also extends downwardly into an arcuately extending slot 1324 in a plate 1330. The plate 1330 is journaled for rotation about the hub 1314 within the relieved portion 1306 on an appropriate bearing 1332. The plate 1330 moves in an arc under the power of an appropriate motor, or other appropriate element, not shown, to cause the pin 1320 to be moved longitudinally in the bore 1310.

The plate 1330 is, of course, circular, and rotates about the hub 1314 of the plate 1300. The pin 1320, with its guide sleeve 1322, reciprocates linearly within the radially extending bore 1310. The slot 1312 aids in guiding the linear movement of the pin 1320 by the cam or guide pin 1324. The actual movement of the pin 1320 and its sleeve 1322 is accomplished through the rotation of the plate 1330 and its arcuately extending slot 1334, in which the cam follower 1324 is disposed. The guide pin 1324 acts as a cam follower as it extends through the slot 1334. With the slot 1334 extending arcuately, as best shown in FIG. 11, rotation of the plate 1330 causes the pin 1320 to move linearly with respect to the bore 1310. Since the plate 1330 moves or rotates in opposite directions, or both clockwise and counterclockwise, the pin 1320 moves inwardly and outwardly, to and from its extended and retracted positions, as desired, and in accordance with the rotation of the plate 1330. As mentioned above, rotation of the plate 1330 may be accomplished by any appropriate means, such as a motor or an actuating cylinder, or the like.

In the above descriptive material, the rotation of the plates during the stranding process has been characterized as reversible. However, it is obvious that the plates may rotate in only a single direction. Such one-way rotation of the plates results in an interwoven or interlaced stranded article. If one-way movement is desired, a reversible motor for rotating the plates is not needed.

For stranding square or rectangular articles, the circular or round plates illustrated in the drawing figures and discussed herein are replaced by square or rectangular plates. With the square or rectangular plates, the stranding pins are aligned generally parallel to each other and generally perpendicular to the edges of the plates. For square or rectangular stranding purposes, generally only two sets of pins are required, with the pins aligned at opposite edges and generally parallel to each other.

Obviously, the desired configuration of the product to be stranded is determinitive of the configuration of the plates to be used. The stranding pins are oriented accordingly. If only part of a circle is desired, then only the corresponding pins are used on circular plates. If two parallel walls or sides are to be stranded, then the pins of opposite sides of a square or rectangular plate are used. Eliptical or other configurations may also be employed for plates, according to the desired end product design.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Stranding apparatus comprising, in combination:
   frame means, including a first support element and a second support element;
   first plate means rotatably secured to the first support element;
   second plate means rotatably secured to the second support element and spaced apart from the first plate means;
   a shaft secured to the frame means for locking together the first plate means and the second plate means for joint rotary movement relative to the first and second support element, and movable vertically for unlocking the first plate means and the second plate means; and
   pin means secured to the first and second plate means and movable between an outer position to receive strands and a retracted position for removal of the strands.

2. The apparatus of claim 1 in which the first plate means is aligned with the second plate means.

3. The apparatus of claim 1 in which the first plate means and the second plate means have a common axis of rotation.

4. The apparatus of claim 3 in which the first plate means is movable along its axis of rotation relative to the second plate means when the shaft is moved vertically to unlock the first plate means and the second plate means.

5. The apparatus of claim 1 in which the first plate means and the second plate means each include
   a central hub,
   an outer portion spaced apart from the central hub, and
   a plurality of bores disposed in the outer portion for receiving the pin means.

6. The apparatus of claim 5 in which the pin means includes a plurality of pins, and each pin of the plurality of pins is disposed in one of the plurality of bores.

7. The apparatus of claim 6 in which the pin means further includes means for moving the pins from and to their outer and their retracted positions.

8. The apparatus of claim 1 in which the first support element and the second support element of the frame means are axially aligned with each other.

9. The apparatus of claim 8 in which the frame means further includes a third support element secured to the first plate means and to the first support element and axially movable relative to the first support element.

10. The apparatus of claim 9 in which the locking shaft of the frame means is movable from a first position for locking together the first and second plate means to a second position for moving the first plate means vertically with respect to the second plate means.

11. Stranding apparatus for stranding a plurality of articles of resin impregnated strands, comprising, in combination:
    rotatable turntable means;
    frame means disposed on the turntable means, including
      first stranding frame means, and
      second stranding frame means spaced apart from the first stranding frame means;
    plate means, including
      a first plate and a second plate spaced apart from each other and secured to the first stranding frame means, and
      a third plate and a fourth plate spaced apart from each other and secured to the second stranding frame means;
    shaft means secured to the frame means, including
      a first locking shaft extending between the first and second plates for locking the first and second plates together and movable to unlock the first and second plates and to raise the first plate relative to the second plate, and
      a second locking shaft extending between the third and fourth plates for locking the third and fourth plates together and movable to unlock the third and fourth plates and to raise the third plate relative to the fourth plate;
    pin means, including a plurality of pins extending outwardly from the plate means and movable between an extended position outwardly from the plate means for receiving strands and a retracted position for removing the strands from the plate means;
    curing means disposed adjacent the turntable means for curing the resin impregnated in the strands disposed on the plurality of pins; and
    means for rotating the turntable means from a first position where the first stranding frame means is stranded to a second position where the first stranding frame means is disposed adjacent the curing means for curing the resin impregnated strands on the first stranding frame means, and the second stranding frame means is at the first position to be stranded.

12. The apparatus of claim 11 in which the plate means is rotatably secured to the frame means.

13. The apparatus of claim 11 in which the first and second locking shafts respectively lock the first and second plates together for joint rotary movement and lock the third and fourth plates together for joint rotary movement.

14. The apparatus of claim 11 in which the plate means includes a plurality of bores for receiving the plurality of pins.

15. The apparatus of claim 14 in which the pin means includes means for moving the pins in the bores between the extended and retracted positions.

* * * * *